(12) United States Patent
Blais

(10) Patent No.: US 7,699,530 B2
(45) Date of Patent: Apr. 20, 2010

(54) OIL SCAVENGE SYSTEM FOR GAS TURBINE ENGINE BEARING CAVITY

(75) Inventor: Daniel Blais, St-Hilaire (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 874 days.

(21) Appl. No.: 11/536,042

(22) Filed: Sep. 28, 2006

(65) Prior Publication Data

US 2008/0080800 A1 Apr. 3, 2008

(51) Int. Cl.
*F16C 33/66* (2006.01)
(52) U.S. Cl. ............... 384/462; 384/466; 384/467; 384/474; 184/11.2
(58) Field of Classification Search ........... 384/292, 384/462, 466, 467, 472, 474; 184/6.1, 6.11, 184/6.12, 11.2; 415/111, 112, 175, 176; 60/39.08, 772
See application file for complete search history.

(56) References Cited

U.S. PATENT DOCUMENTS

| | | | | |
|---|---|---|---|---|
| 1,352,298 A * | 9/1920 | Mears | ................. | 184/11.2 |
| 4,525,995 A * | 7/1985 | Clark | ................. | 184/6.12 |
| 4,576,001 A * | 3/1986 | Smith | ................. | 60/39.08 |
| 4,683,714 A * | 8/1987 | Thebert | ................. | 184/6.11 |
| 5,261,751 A * | 11/1993 | Heinz | ................. | 384/466 |
| 5,489,190 A * | 2/1996 | Sullivan | ................. | 384/292 |
| 6,516,618 B1 * | 2/2003 | Bock | ................. | 60/782 |
| 6,996,968 B2 * | 2/2006 | Peters et al. | ................. | 60/39.08 |
| 7,387,445 B2 * | 6/2008 | Swainson | ................. | 384/462 |
| 2006/0037325 A1 * | 2/2006 | Peters et al. | ................. | 60/772 |
| 2006/0081419 A1 * | 4/2006 | Care et al. | ................. | 184/6.11 |

* cited by examiner

*Primary Examiner*—Marcus Charles
(74) *Attorney, Agent, or Firm*—Ogilvy Renault LLP

(57) ABSTRACT

An oil scavenging system and method suitable for use in a gas turbine engine having a bearing housing. The bearing housing provides for arcuate slots within the housing and a plurality of peripherally arranged apertures disposed for cooperation with the arcuate slots. During rotation of the bearing and shaft, the rotational momentum induces rotation of the oil which distributes the oil to the peripheral circumference of the housing for eventual passage through the slots and apertures. The arrangement maximizes the use of the circumferential space of the bearing for efficient oil distribution.

12 Claims, 4 Drawing Sheets

SECTION 3-3

SECTION 2-2

SECTION 3-3

OIL SCAVENGE SYSTEM FOR GAS TURBINE ENGINE BEARING CAVITY

TECHNICAL FIELD

The invention relates generally to an oil scavenging system and method and, more particularly, to an improved oil scavenging system and method for use in a gas turbine engine.

BACKGROUND OF THE ART

The bearing cavity of a gas turbine engine houses the bearing which requires a vast amount of oil for ensuring proper lubrication and heat dissipation for the bearing. Scavenging of the oil is accordingly quite important and return of the oil by gravity is insufficient for prescribed requirements. This limitation is also exacerbated by the fact that the oil cannot exceed the level of the maximum permissible cavity oil level or the oil will leak through the seals into surrounding area, creating an unwanted situation.

Accordingly, there is a need to provide an improved oil circulation system for a gas turbine engine not so limited as present arrangements.

SUMMARY OF THE INVENTION

It is therefore an object of this invention to provide an improved oil distribution system and method of circulating the oil to comply with gas turbine engine requirements.

In one aspect, the present invention provides a bearing cavity scavenge device for scavenging oil in a gas turbine engine comprising: a hollow annular body having a first section and a second section, the body for receiving a rotatable bearing; a plurality of radially arranged spaced apart apertures within the first section for recovering oil; and a plurality of arcuate slot means disposed in radial relation in the second section and axially spaced from the apertures, the apertures and the slot means configured for scavenging oil displaced during rotation of the bearing.

In another aspect, the present invention provides a method of circulating oil flow within a bearing cavity of a gas turbine engine to ensure adequate lubrication of a bearing rotating within the cavity, comprising: providing a source of oil for the bearing; providing an oil scavenging bearing having radially oriented arcute slots and radially disposed apertures spaced therefrom; inducing rotation of the oil from the momentum of the rotating bearing; collecting rotating oil through the arcute slots; scavenging rotating oil through said radially disposed apertures for return to the source; and reintroducing scavenged oil to the source.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
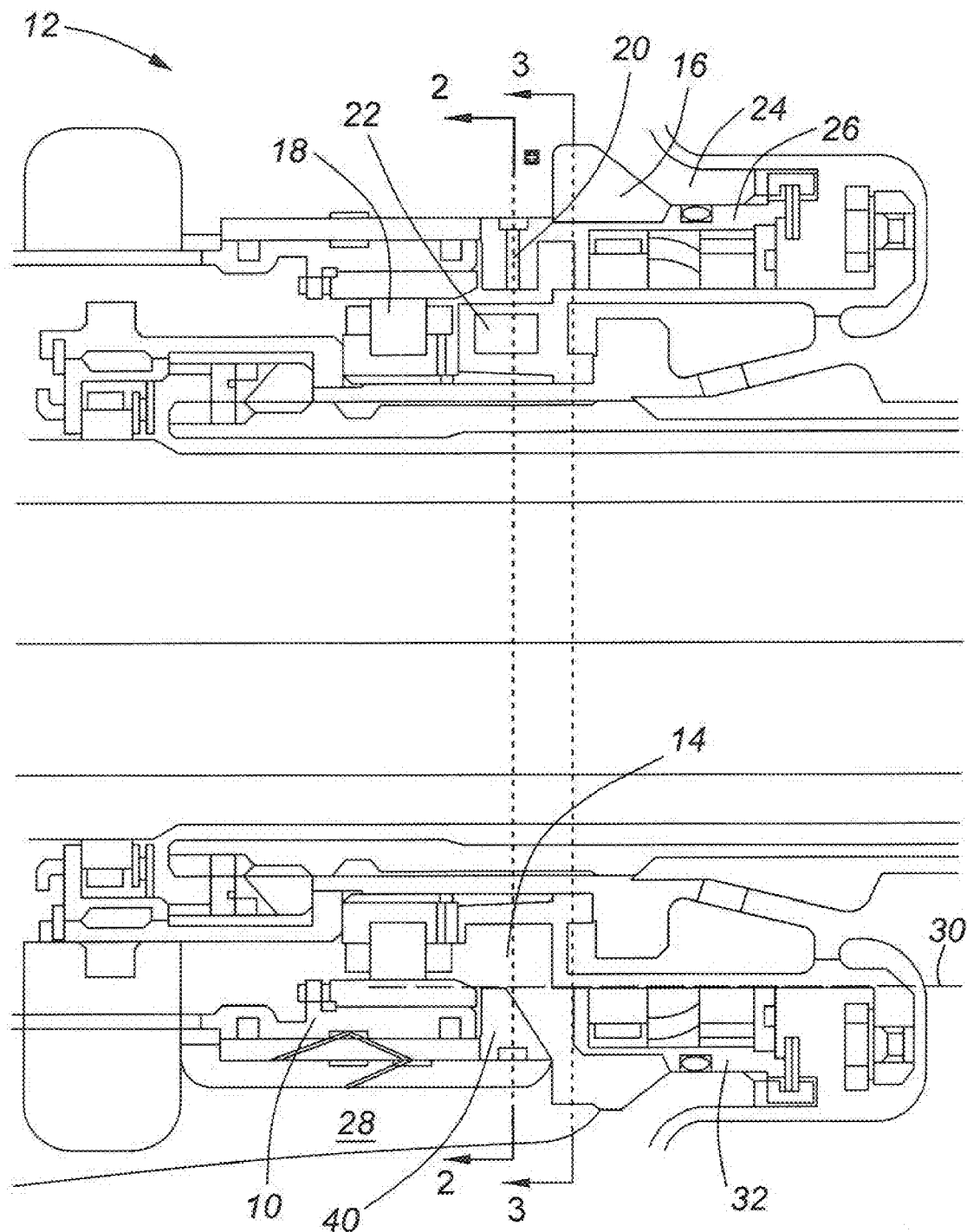
FIG. 1 is a cross sectional view of the bearing housing.
Figure 2:
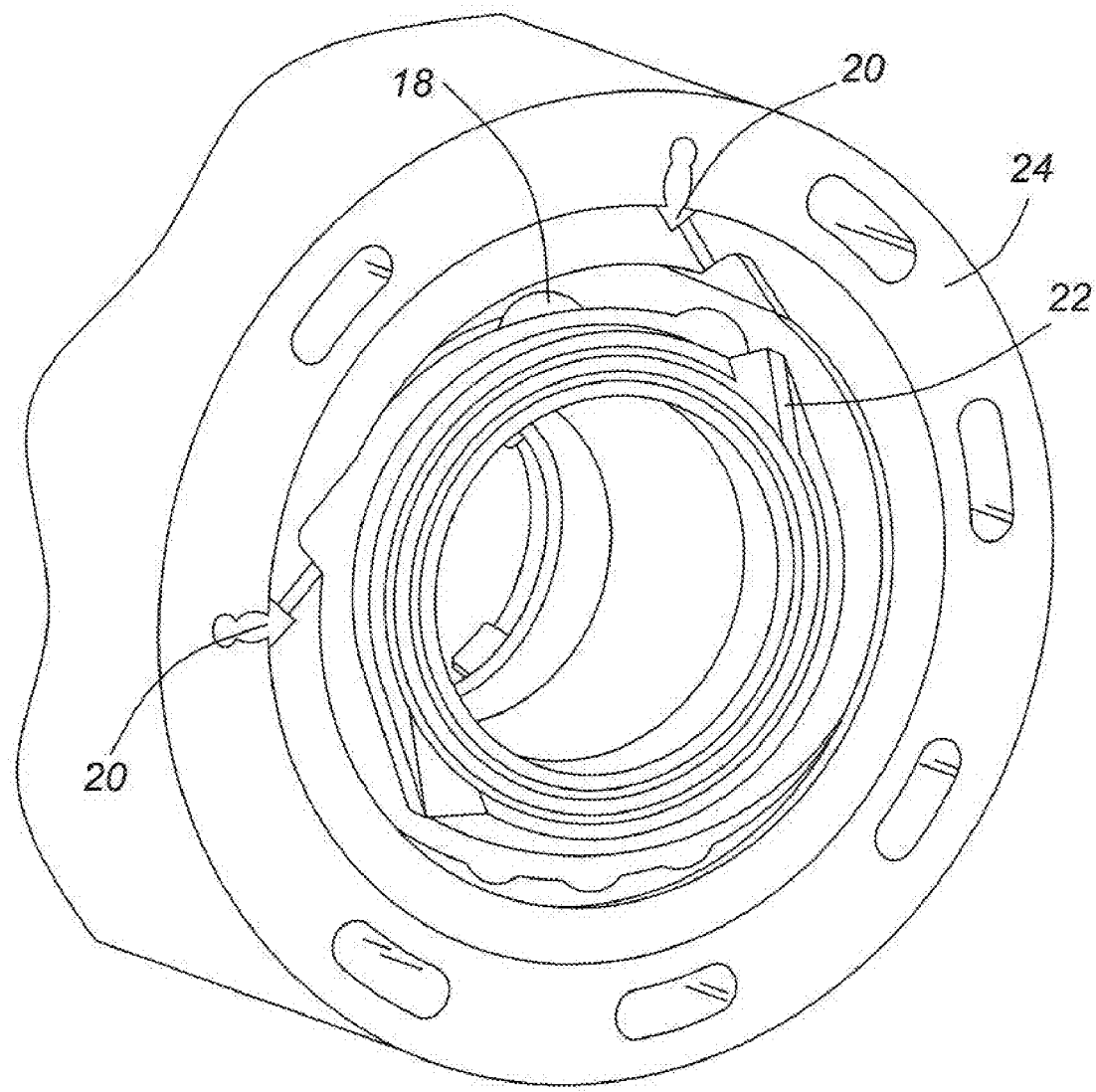
FIG. 2 is a sectional view of the bearing housing along line 2-2.
Figure 3:
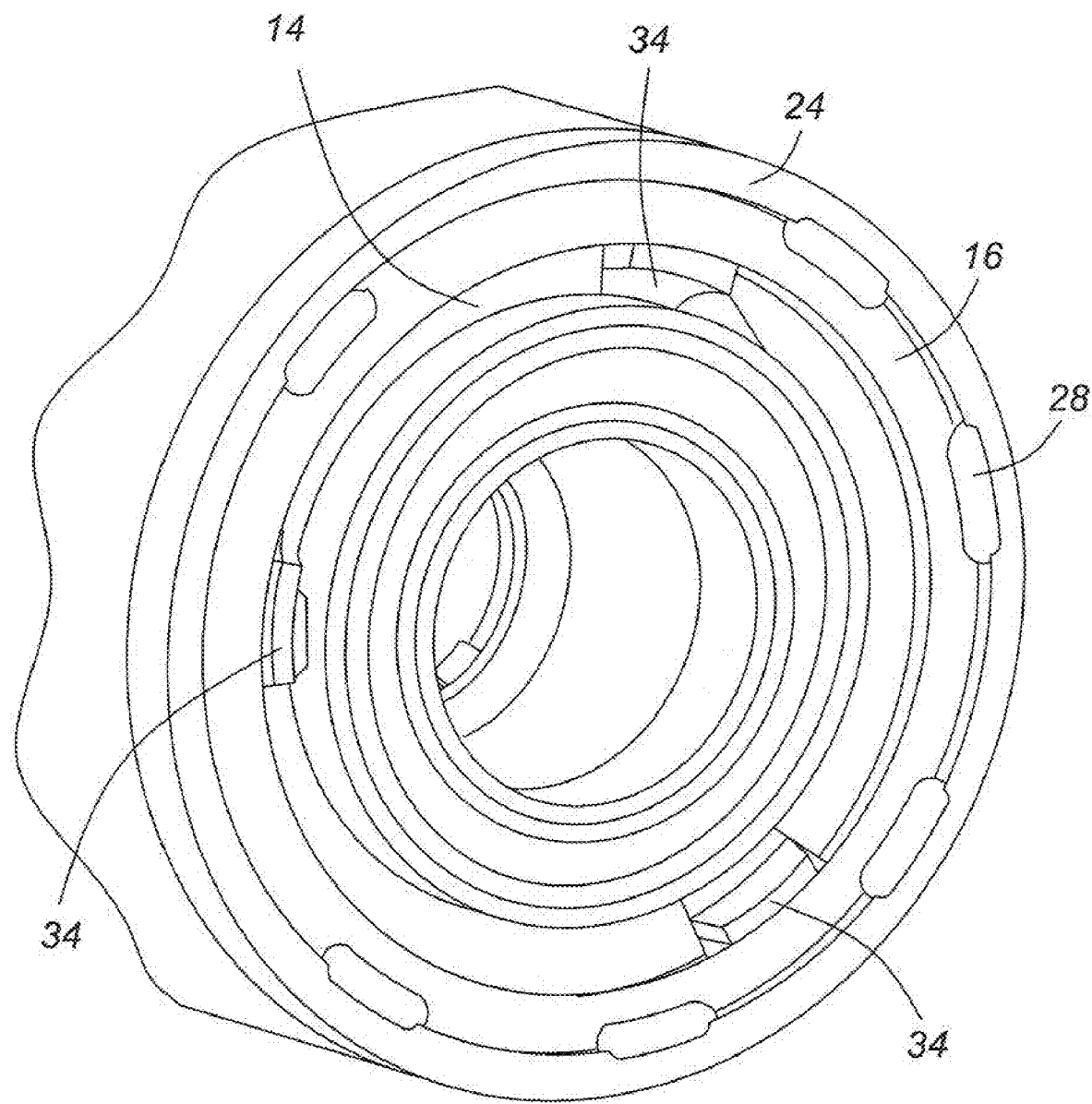
FIG. 3 is a sectional view of the bearing housing along line 3-3.
Figure 4:
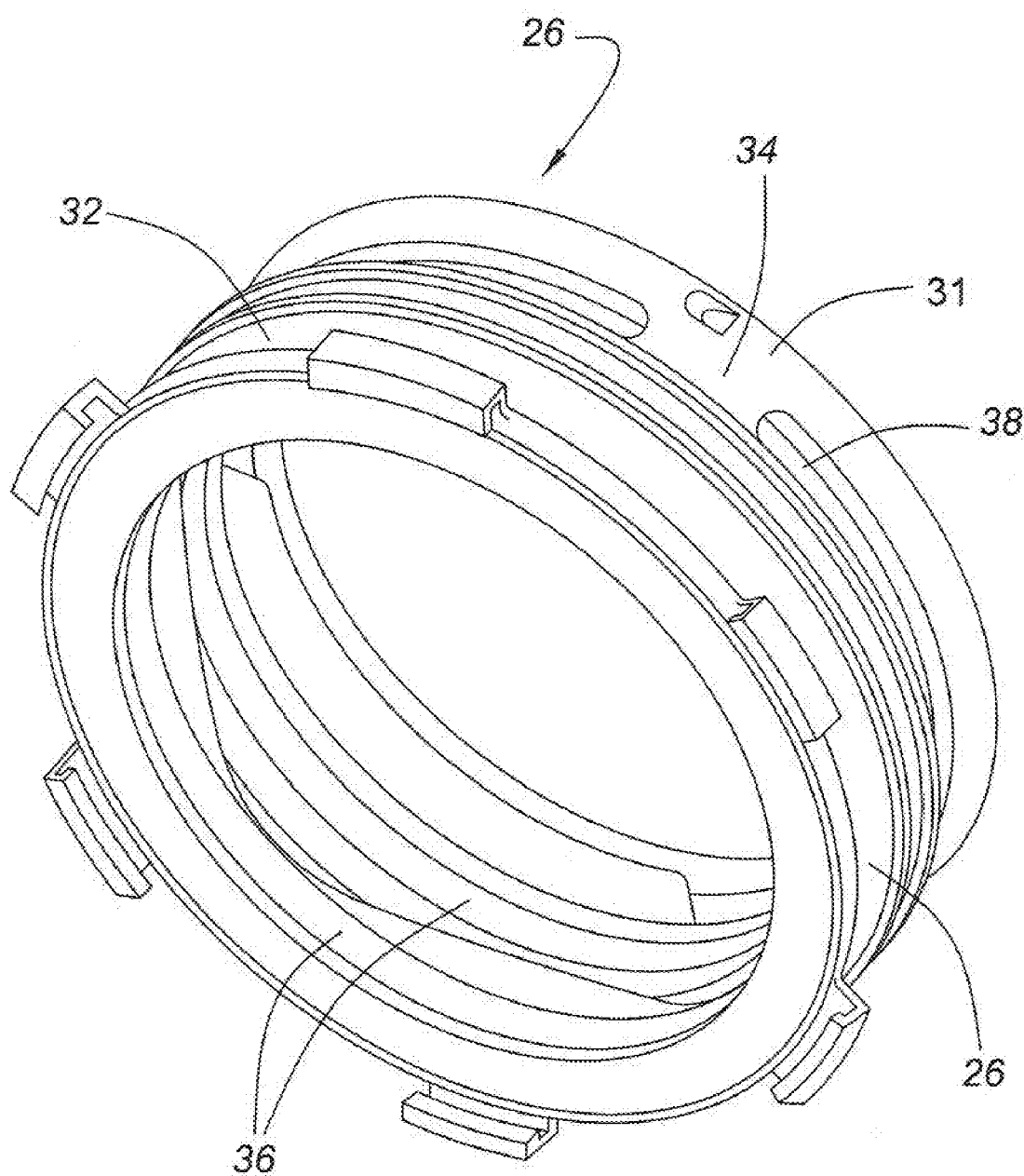
FIG. 4 is a perspective view of an embodiment of the carbon seal housing.

Referring to FIG. 1, shown is a cross section of a bearing housing 10, within a gas turbine engine, generally denoted by numeral 12 as bearing cavity.

Referring to the remaining Figures collectively, the bearing cavity 12, is composed of two coaxial cavities 14 and 16, respectively. Cavity 14, the inner cavity, is an active cavity and it is where the bearing 18 is located. Oil jets 20 are positioned radially and substantially peripherally of the housing 10 to supply oil to the bearing 18. The jets 20 are static and distribute the oil from a source thereof and particularly to rotating oil scoops 22. The scoops 22 capture the oil and direct it to the bearing 18.

Turning now to the outer cavity 16, the latter is bounded by the outer case 24 and a carbon seal housing 26. A plurality of radially arranged oil scavenging apertures 28 are disposed coaxially about the bearing 18 and connect, for fluid communication, the outer cavity 16 with the remainder of the oil system of the engine.

Carbon seal housing 26 separates the two coaxial cavities 14 and 16. The housing 26, includes a front section 40 and a rear section 32 connected via spacers 34. Section 31 houses oil jets 20 and rear section 32 retains dual carbon seals 36.

Arcuate slots 38 are machines into the housing radially and have an inclined profile for assisting in directing the oil passing through the housing 26 and more particularly, from the inner cavity 14 to the outer cavity 16. Spacers 34 also complement the profiled slots 38; the former are contoured to facilitate unencumbered flow.

It has been found that by using the existing windage and transferring this to the outer cavity 16, the result is the application of centrifugal force to the heavier oil. The force effectively pressurizes the oil on the outer wall of the outer cavity 16. Upon the thickness of the oil reaching the height of oil scavenging apertures 28, the oil will drain via the apertures 28 to the remainder of the oil system. In this manner, induced movement of the oil is achieved by making use of the rotational energy of the bearing 18.

At low speed, oil jets 20 discharge the oil directly onto the inclined profile of the slots 38 in between passages of the oil scoops resulting in the direction of the oil into cavity 16 for scavenging by oil scavenging apertures 28.

By the provisions noted herein, the oil level in the casing is precluded from rising over the maximum permissible cavity oil level 30 to provide for a particularly efficient oil scavenging system using the maximum circumferential space available and controlling the flow of oil at all times during operation of the engine.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

The invention claimed is:

1. A bearing cavity scavenge device for scavenging oil in a gas turbine engine comprising:
    a hollow annular body having a first section and a second section, said body for receiving a rotatable bearing;
    a plurality of radially arranged spaced apart apertures within said first section for recovering oil; and
    a plurality of arcuate slot means disposed in radial relation in said second section and axially spaced from said apertures, said apertures and said slot means configured for scavenging oil displaced during rotation of said bearing.

2. The device as defined in claim 1, wherein said first section includes a plurality of oil delivery jets arranged peripherally in spaced relation from said apertures.

3. The device as defined in claim 1, wherein said arcuate slot means include an inclined profile for assisting in direction of said oil.

4. The device as defined in claim 1, wherein said annular body includes spacer means between adjacent arcuate slot means.

5. The device as defined in claim 4, wherein said slot means comprise struts.

6. The device as defined in claim 5, wherein said struts include a streamlined profile.

7. The device as defined in claim 1, further including oil jet means for introducing oil into said cavity.

8. The device as defined in claim 1, in combination with a gas turbine engine.

9. The device as defined in claim 1, in combination with a marine gas turbine engine.

10. A method of circulating oil flow within a bearing cavity of a gas turbine engine to ensure adequate lubrication of a bearing rotating within said cavity, comprising:
provided a source of oil for said bearing;
providing an oil scavenging bearing having radially oriented arcuate slots and radially disposed apertures spaced therefrom;
inducing rotation of said oil from the momentum of the rotating bearing;
collecting rotating oil through said arcuate slots;
scavenging rotating oil through said radially disposed apertures for return to said source; and
reintroducing scavenged oil to said source.

11. The method as defined in claim 10, further including the step of providing oil jet means for spraying oil into contact with said radially oriented arcuate slots for contact with said bearing during lower rotation velocity of said bearing.

12. The method as defined in claim 11, wherein said oil scavenging bearing scavenges oil within said bearing during rotation of said bearing by centrifugal force for circulation throughout said bearing.

* * * * *